US012255830B2

(12) United States Patent
Vasudevan et al.

(10) Patent No.: US 12,255,830 B2
(45) Date of Patent: Mar. 18, 2025

(54) APPLICATION-LEVEL NETWORK QUEUEING

(71) Applicant: Intel Corporation, Santa Clara, CA (US)

(72) Inventors: Anil Vasudevan, Portland, OR (US); Kiran A. Patil, Portland, OR (US); Arun Chekhov Ilango, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/201,068

(22) Filed: May 23, 2023

(65) Prior Publication Data

US 2023/0300078 A1    Sep. 21, 2023

Related U.S. Application Data

(63) Continuation of application No. 17/566,381, filed on Dec. 30, 2021, now Pat. No. 11,706,151, which is a
(Continued)

(51) Int. Cl.
*H04L 47/50* (2022.01)
*H04L 47/24* (2022.01)
(Continued)

(52) U.S. Cl.
CPC .............. *H04L 47/50* (2013.01); *H04L 47/24* (2013.01); *H04L 47/2475* (2013.01);
(Continued)

(58) Field of Classification Search
CPC ..... H04L 47/50; H04L 47/24; H04L 47/2475; H04L 49/90; H04L 49/9068; H04L 43/10; H04L 47/125; H04L 47/62
See application file for complete search history.

(56) References Cited

U.S. PATENT DOCUMENTS 6,256,660 B1   7/2001   Govindaraju et al.
6,295,532 B1   9/2001   Hawkinson
(Continued)

FOREIGN PATENT DOCUMENTS

CN    1429024 A   *   7/2003   ............ H04L 29/06
CN    104376036       2/2015
(Continued)

OTHER PUBLICATIONS

Extended European Search Report for European Patent Application No. 16879810.6, dated May 22, 2019.
(Continued)

*Primary Examiner* — Atique Ahmed
(74) *Attorney, Agent, or Firm* — Essential Patents Group, LLP; Christopher K. Gagne

(57) ABSTRACT

There is disclosed in one example a network interface card (NIC), comprising: an ingress interface to receive incoming traffic; a plurality of queues to queue incoming traffic; an egress interface to direct incoming traffic to a plurality of server applications; and a queuing engine, including logic to: uniquely associate a queue with a selected server application; receive an incoming network packet; determine that the selected server application may process the incoming network packet; and assign the incoming network packet to the queue.

18 Claims, 10 Drawing Sheets

Related U.S. Application Data continuation of application No. 16/773,801, filed on Jan. 27, 2020, now abandoned, which is a continuation of application No. 14/998,138, filed on Dec. 26, 2015, now Pat. No. 10,547,559.

(51) Int. Cl.
*H04L 47/2475* (2022.01)
*H04L 49/90* (2022.01)
*H04L 43/10* (2022.01)

(52) U.S. Cl.
CPC .......... *H04L 49/90* (2013.01); *H04L 49/9068* (2013.01); *H04L 43/10* (2013.01)

(56) References Cited

U.S. PATENT DOCUMENTS

| | | |
|---|---|---|
| 7,433,949 B2 | 10/2008 | Xu et al. |
| 7,702,739 B1 | 4/2010 | Cheng et al. |
| 7,937,499 B1 | 5/2011 | Tripathi |
| 8,650,168 B2* | 2/2014 | Rathi .................... G06F 16/182 707/694 |
| 9,378,047 B1 | 6/2016 | Gould et al. |
| 9,619,286 B1 | 4/2017 | Wagner et al. |
| 10,169,235 B2 | 1/2019 | Saha et al. |
| 10,547,559 B2 | 1/2020 | Vasudevan et al. |
| 10,756,816 B1 | 8/2020 | Dreier |
| 11,474,868 B1 | 10/2022 | Musa et al. |
| 2002/0114277 A1 | 8/2002 | Kyusojin |
| 2002/0184446 A1* | 12/2002 | Kagan ..................... H04L 49/90 711/145 |
| 2003/0118029 A1* | 6/2003 | Maher, III ........... H04L 47/2441 370/395.43 |
| 2004/0215847 A1 | 10/2004 | Dirstine et al. |
| 2004/0230875 A1 | 11/2004 | Kapauan et al. |
| 2006/0143710 A1 | 6/2006 | Desai et al. |
| 2006/0212589 A1 | 9/2006 | Hayer et al. |
| 2006/0233100 A1 | 10/2006 | Luft et al. |
| 2007/0067324 A1 | 3/2007 | Burkhardt |
| 2007/0067770 A1 | 3/2007 | Thomasson |
| 2007/0130367 A1 | 6/2007 | Kashyap |
| 2007/0143430 A1 | 6/2007 | Johnson et al. |
| 2008/0285560 A1* | 11/2008 | Curtis ................... H04L 45/122 370/392 |
| 2009/0217369 A1 | 8/2009 | Abeni et al. |
| 2010/0169888 A1* | 7/2010 | Hare ...................... H04L 67/535 709/205 |
| 2010/0202289 A1* | 8/2010 | Madan .................. H04L 5/0085 370/329 |
| 2011/0019552 A1 | 1/2011 | Karaoguz et al. |
| 2011/0128923 A1 | 6/2011 | Cilli et al. |
| 2011/0142064 A1 | 6/2011 | Dubal et al. |
| 2011/0296415 A1 | 12/2011 | Khan et al. |
| 2012/0020214 A1 | 1/2012 | Brown et al. |
| 2012/0039337 A1 | 2/2012 | Jackowski et al. |
| 2012/0078994 A1 | 3/2012 | Jackowski et al. |
| 2012/0084438 A1* | 4/2012 | Raleigh ................ H04L 63/1425 709/224 |
| 2012/0240119 A1 | 9/2012 | Xie et al. |
| 2012/0240185 A1 | 9/2012 | Kapoor et al. |
| 2013/0077486 A1 | 3/2013 | Keith |
| 2013/0138760 A1 | 5/2013 | Tsirkin |
| 2013/0142066 A1 | 6/2013 | Yamaguchi et al. |
| 2013/0203422 A1 | 8/2013 | Masputra et al. |
| 2013/0204965 A1 | 8/2013 | Masputra et al. |
| 2013/0298201 A1 | 11/2013 | Aravindakshan et al. |
| 2014/0064295 A1 | 3/2014 | Deisinger et al. |
| 2014/0075567 A1* | 3/2014 | Raleigh .............. G06Q 30/0283 726/26 |
| 2014/0096165 A1 | 4/2014 | Bei et al. |
| 2014/0098671 A1* | 4/2014 | Raleigh ................. H04M 15/58 370/235 |
| 2014/0137215 A1* | 5/2014 | Hummel ............. G06F 13/4022 726/5 |
| 2014/0280709 A1 | 9/2014 | Li et al. |
| 2014/0281058 A1 | 9/2014 | Solihin |
| 2014/0351206 A1 | 11/2014 | Lim |
| 2015/0012864 A1* | 1/2015 | Goodwin ................ H04L 67/10 715/771 |
| 2015/0049769 A1 | 2/2015 | Tamir et al. |
| 2015/0055468 A1 | 2/2015 | Agarwal et al. |
| 2015/0067819 A1 | 3/2015 | Shribman et al. |
| 2015/0156124 A1 | 6/2015 | Tsuji |
| 2015/0277997 A1 | 10/2015 | Pope et al. |
| 2015/0334008 A1 | 11/2015 | Kim et al. |
| 2016/0232111 A1 | 8/2016 | Chang et al. |
| 2016/0378545 A1 | 12/2016 | Ho |
| 2017/0048774 A1 | 2/2017 | Cheng et al. |
| 2017/0103031 A1 | 4/2017 | Liu et al. |
| 2017/0147522 A1 | 5/2017 | Yu et al. |
| 2017/0187640 A1 | 6/2017 | Vasudevan et al. |
| 2017/0324637 A1 | 11/2017 | Emam et al. |
| 2018/0287923 A1 | 10/2018 | Emam et al. |
| 2018/0335957 A1 | 11/2018 | Enz et al. |
| 2019/0079883 A1 | 3/2019 | Wang et al. |
| 2019/0245924 A1 | 8/2019 | Li |
| 2020/0127934 A1 | 4/2020 | Fu |
| 2020/0186579 A1 | 6/2020 | Adams et al. |
| 2020/0396126 A1 | 12/2020 | L'Ecuyer et al. |
| 2021/0075745 A1 | 3/2021 | Badger |
| 2021/0216459 A1 | 7/2021 | Benhanokh et al. |

FOREIGN PATENT DOCUMENTS

| | | | | |
|---|---|---|---|---|
| CN | 103038652 B | * | 11/2016 | ........... G06Q 30/016 |
| JP | 2002185509 | | 6/2002 | |
| JP | 2015527755 | | 9/2015 | |
| WO | 2017112326 | | 6/2017 | |

OTHER PUBLICATIONS

Final Office Action for U.S. Appl. No. 16/773,801, dated Dec. 5, 2022.
International Search Report and Written Opinion for PCT Patent Application No. PCT/US2016/063718, dated Mar. 8, 2017.
Notice of Allowance for U.S. Appl. No. 16/773,801, dated Jan. 25, 2022.
Office Action and Search Report for Chinese Patent Application No. 201611054171.8, dated Aug. 6, 2019.
Office Action for Chinese Patent Application No. 201611054171.8, dated Feb. 28, 2020.
Office Action for Japanese Patent Application No. 2016-234995, dated Jul. 31, 2018.
Office Action for Japanese Patent Application No. 2016-234995, dated Nov. 21, 2017.
Office Action for U.S. Appl. No. 16/773,801, dated Jul. 15, 2022.
Office Action for U.S. Appl. No. 16/773,801, dated Jul. 6, 2022.
Office Action for U.S. Appl. No. 16/773,801, dated Mar. 30, 2021.
Office Action for U.S. Appl. No. 16/773,801, dated Sep. 13, 2021.
"DSCP to Queue", retrieved online via https://www.cisco.com/assets/sol/sb/Switches_Emulators_v2_3_5_xx/help/350_550/tesla_350_550_olh/dscp_to_queue.html; Nov. 16, 2021.
"PyMOTW", Published Jan. 2, 2014; Publisher: Doug Hellmann (The Phython Standard Library by Example).
"Using threads to Handle Sockets", Published May 14, 201; Publisher: Levi.
Herbert, T., "[Patch] net: add Documentation/networking/scaling.txt", Jul. 31, 2011; retrieved online via https://www.spinics.net/lists/linux-doc/msg02975.html, Nov. 1, 2021.
Extended European Search Report from European Patent Application No. 20931601.7 notified Apr. 4, 2024, 7 pgs.
Final Office Action from U.S. Appl. No. 16/849,915 notified Sep. 21, 2023, 38 pgs.
International Search Report and Written Opinion from PCT/US2016/065116 notified Apr. 9, 2021, 10 pgs.
Non-Final Office Action from U.S. Appl. No. 16/849,915 notified May 1, 2023, 29 pgs.

(56) References Cited

OTHER PUBLICATIONS

Notice of Allowance from U.S. Appl. No. 16/849,915 notified Feb. 21, 2024, 11 pgs.
Office Action from Chinese Patent Application No. 202111569280.4 notified Jun. 19, 2024, 8 pgs.
Office Action from Chinese Patent Application No. 202111569280.4 notified Nov. 30, 2023, 3 pgs.
"Configure Class of Service", <https://docs.vmware.com/en/VMware-SD-WAN/5.4/VMware-SD-WAN-Ad...stration-Guide/GUID-AF976888-0795-4EDC-AC0F-4C81E4F541F2.html> May 22, 2023, 4 pgs.
"Dynamic Multipath Optimization", <https://docs.vmware.com/en/VMware-SD-WAN/5.4/VMware-SD-WAN-A...tration-Guide/GUID-BEDE8CBD-D55B-4AB4-949C-E7CC35ADF034.html> accessed online Dec. 8, 2023, 20 pgs.
"Dynamic Multipath Optimization", White Paper, Dec. 2020, 18 pgs.
"Embracing the Future of Data Management: the Potential Benefits of Application Device Queue in VMware VSAN", <https://www.mrvsan.com/embracing-the-future-of-data-management-the-potential-benefits-of-application-device-queue-in-vmware-vsan/> Jul. 7, 2023, 3 pgs.
"Mellanox Message Acceleration Software Enables Lowest-Latency for a Wide Range of Financial Services and Web 2.0 Applications," Press Release, Mellanox Technologies, May 16, 2011, 3 pgs.
"Optimizing storage applications based on Kernel TCP/IP stack", ACM, Aug. 17-20, 2020, Edmonton, Canada, 10 pgs.
"Show 257: VeloCloud SD-WAN: Sponsored", <https://packetpushers.net/podcast/show-257-velocloud-sd-wan-sponsored/> Oct. 2, 2015, 4 pgs.
"Software Defined Cloud Connector for WSS", Symantec 2018, 5 pgs.
"VeloCloud's SD-WAN puts packet steering on steroids to optimize performance", <https://www.networkworld.com/article/939110/veloclouds-sd-wan-puts-packet-steering-on-steroids-to-optimize-performance.html> accessed online Dec. 8, 2023, 5 pgs.
"VMware SD-WAN Edge platform specifications", Nov. 2023, 18 pgs.
"VMware SD-WAN QoS Overview", DMPO and integration with MPLS QoS, Solution Overview, 9 pgs.

Bureddy, Devendar, "Enabling Exascale Co-Design Architecture", Mellanox Technologies, OSU MUG, Aug. 2016, 130 pgs.
Dumazet, Eric, "Busy Polling: Past, Present, Future", Google, netdev 2.1, Montreal, 2017, 4 pgs.
Harris, Jim, "SPDK NVMe-oF TCP Transport", <https://spdk.io/news/2018/11/15/nvme_tcp/> Nov. 15, 2018, 1 pg.
Intel, "Performance Testing Application Device Queues (ADQ) with Redis", Solution Brief, Intel Connectivity, Ethernet Networking Division, Mar. 8, 2019, 7 pgs.
Kamath, Aditya, "Performance Analysis of Linux Kernel Library User-Space Top Stack", Salesforce engineering, <https://engineering.salesforce.com/performance-analysis-of-linux-kernel-library-user-space-tcp-stack-be75fb198730/> downloaded from the internet on Jun. 22, 2022, 6 pgs.
Li, Huaicheng , et al., "LeapIO: Efficient and Portable Virtual NVMe Storage", Proceedings of the Twenty-Fifth International Conference on Architectural Support for Programming Languages and Operating Systems (ASPLOS '20), Mar. 16-20, 2020, Lausanne, Switzerland. ACM, New York, NY, USA, 15 pgs.
Ousterhout, Amy, et al., "Shenango: Achieving High CPU Efficiency for Latency-sensitive Datacenter Workloads" , Proceedings of the 16th USENIX Symposium on Networked Systems Design and Implementation (NSDI '19). Feb. 26-28, 2019, 18 pgs.
Vasudevan, Anil, "Intel Ethernet 80 Series With Application Device Queues [ADQ]", Interconnect Day, Apr. 8, 2019, 23 pgs.
Xing, Michael, et al., "A New Windows Monolithic NVMe SSD Driver in Cloud", 2019 Storage Developer Conference, Sep. 23-26, 2019, Santa Clara, CA, 26 pgs.
Yang, Ziye, "SPDK based user space NVMe over TCP transport solution", 2019 Storage Developer Conference, Intel Corporation, Sep. 23-26, 2019, Santa Clara, CA, 29 pgs.
Yang, Ziye, et al., "uNVMe-TCP: A User Space Approach to Optimizing NVMe over Fabrics TCP Transport", Springer Nature Switzerland AG 2020, pp. 125-142.
Extended European Search Report from European Patent Application No. 24177348.0 notified Jul. 1, 2024, 7 pgs.
Notice of Allowance from U.S. Appl. No. 16/849,915 notified Aug. 5, 2024, 23 pgs.
Office Action from Chinese Patent Application No. 202111569280.4 notified Nov. 18, 2024, 6 pgs.

* cited by examiner

APPLICATION-LEVEL NETWORK QUEUEING

CROSS-REFERENCE TO RELATED APPLICATIONS

This application is a continuation of prior co-pending U.S. patent application Ser. No. 17/566,381, filed 30 Dec. 2021, titled "Application-Level Network Queueing", which is a continuation of prior U.S. patent application Ser. No. 16/773,801, filed 27 Jan. 2020, titled "Application-Level Network Queueing", which is a continuation of prior U.S. patent application Ser. No. 14/998,138, filed 26 Dec. 2015, titled "Application-Level Network Queueing." Each of the aforesaid prior U.S. patent applications is incorporated herein by reference in its entirety for all purposes.

FIELD OF THE SPECIFICATION

This disclosure relates in general to the field of computer networking, and more particularly, though not exclusively to, a system and method for application-level network queueing.

BACKGROUND

Busy polling, also known as "busy waiting" or "spinning," is a technique in which a process repeatedly monitors a condition to see if it has become true. For example, if the process needs input, it may continually loop, watching an input buffer to see if data have become available. Other uses may be to see if a key has been pressed, or if a lock is available. Another use is to create a known time delay, such as by "doing nothing" for a specified number of milliseconds, though variations in processor speed may make this not completely reliable.

Busy polling may be a useful technique particularly in low-level programming, where interrupt-driven processing may be inefficient or cumbersome.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
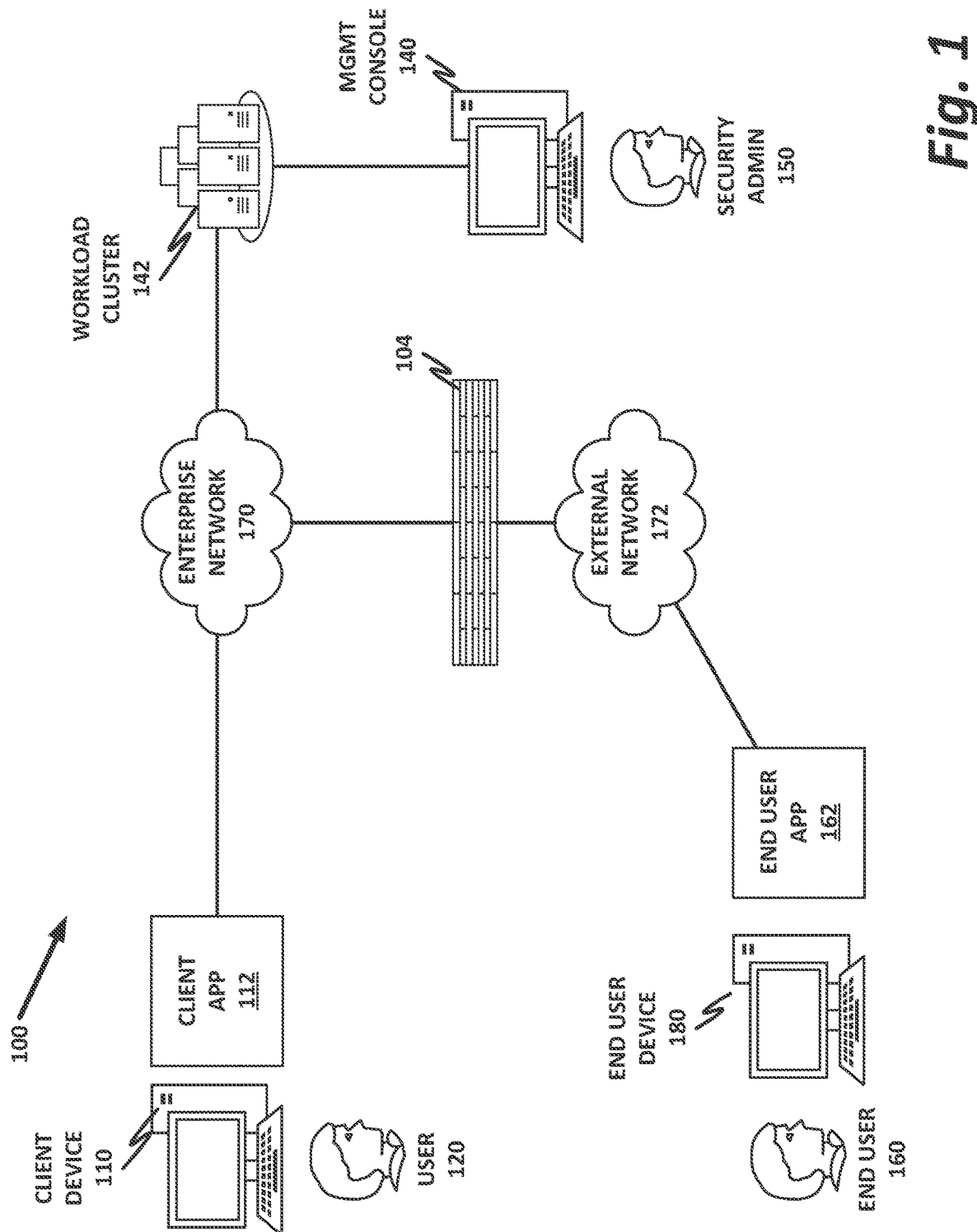
FIG. 1 is a block diagram of a security-enabled network according to one or more examples of the present specification.

In an example, there is disclosed a network interface card (NIC), comprising: an ingress interface to receive incoming traffic; a plurality of queues to queue incoming traffic; an egress interface to direct incoming traffic to a plurality of server applications; and a queuing engine, including logic to: uniquely associate a queue with a selected server application; receive an incoming network packet; determine that the selected server application may process the incoming network packet; and assign the incoming network packet to the queue.

Embodiments of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

By way of example, modern day data center tiers may include web servers and data caching servers, with "Big Data" backends like the "Hadoop" software framework. These may be networked using leaf spine architectures. In one example, these tiers are distributed systems in and of themselves and typically service many thousands of concurrent connections, with the number of connections expected to increase in the future as the number of cores on the end nodes increase.

Some data centers may have a target performance determinism, such as to meet contractual requirements or as a competitive differentiator. Providing the desired performance determinism (e.g., 99.99 percentile latency, with consistent throughput and CPU utilization) for distributed systems applications in this environment may be a challenge. In many cases, the networking interface is one of the primary contributors to this issue, as it can become a bottleneck to application performance on a busy, high-end server.

This specification describes a system and method for application-level network queuing (ALNQ), which address network interface bottleneck in a scalable manner. In an embodiment of ALNQ, an improved network interface card (NIC) is provided, and adjustments may also be made to the existing network stack, such as the Open Systems Interconnection (OSI) or transmission control protocol/internet protocol (TCP/IP) stack. Alternatively, in some embodiments, the host network stack is bypassed in whole or in part, and parallel offloaded or onloaded stacks may be run.

Many NICs divide incoming traffic into a plurality of separate "queues," with traffic being load balanced to queues based on, for example, a hashing algorithm based on a socket tuple that includes the source media access control address (MAC), destination MAC, and/or protocol. ALNQ addresses issues, such as that applications may desire to have their own "visible" queues and load balancing control using the operating system's networking stack. ALNQ makes this possible by creating scalable application specific queues on NICs with socket layer visibility and an affinitization and wakeup algorithm applied to kernel event multiplexing interfaces like "EPOLL" and "KQUEUE." In selected embodiments, this leads to lower and deterministic average and tail latencies, and, higher throughput within latency tolerance boundaries, which may help in scaling distributed systems.

In an embodiment, ALNQ takes a top-down view with respect to steering traffic to an application and delivering low latency communication. Applications, from a networking perspective, may distinguish themselves within a system by virtue of a port number. For example, an HTTP daemon may listen on port 80, while an e-mail daemon may listen on port 25. ALNQ may use the port number (along with other relevant identifying information) as the primary key for assigning traffic to a queue, i.e. application specific queues. Traffic into these queues may be multiplexed via existing schemes like "Receive Side Scaling" (RSS) for hash-based load balancing, or Intel® Ethernet Flow Director for determinate matching.

Information about the assigned queue may be passed up to the application as an opaque identifier. The application may then use this identifier for alignment hints. For example, an application that uses EPOLL may align application thread handling the file descriptors to the queue, thus streamlining access and mitigating effects from cache line bouncing of socket and protocol related data structures. Interrupts may also be tuned to better match application behavior, as these queues can be distributed between applications, rather than between cores, which may cause them to be shared between applications. Thus, low latency as an attribute can be applied to an entire application, and therefore a queue set, rather than for a socket (or flow) that is open. This separation also allows for direct application signaling schemes for wakeup before protocol processing is performed.

Advantageously, ALNQ steers NIC traffic by assigning queues not per interface or virtual socket interface (VSI), or by VMs or traffic classes, but rather per port number, with the port number functioning as an application identifier. From a networking perspective, a port number may operate as a useful primitive for identifying an application on a particular machine. Note that the application identifier could be any suitable application identifier other than the port number.

Further advantageously, ALNQ can load balance the queues assigned to an application/port number using known hash-based schemes like RSS or exact match schemes like Flow Director Further advantageously, ALNQ may pass queue information as a token to the application, such as via an enhancement to the sockets interface options.

Further advantageously, applications may align threads to queues using these tokens.

Further advantageously, separating application-specific traffic early provides a range of affinitization choices, such as using existing low-latency methods such as Busy Poll Sockets (BPS), providing scalable aligning of queues to application threads, or applying quality of service or security policies.

Further advantageously, ALNQ enables an interrupt signaling scheme wherein interrupts signal a sleeping application thread directly, which may then pull data out from device queues.

A system and method for application level network queueing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a secured enterprise 100 according to one or more examples of the present specification. In this example, secured enterprise 100 may be configured to provide services or data to one or more customers 162, who may access information or services via external network 172. This may require secured enterprise 100 to at least partly expose certain services and networks to the outside world, thus creating a logical security aperture.

Within secured enterprise, one or more users 120 operate one or more client devices 110. Each device may include an appropriate operating system, such as Microsoft Windows, Linux, Android, Mac OSX, Apple iOS, Unix, or similar. Some of the foregoing may be more often used on one type of device than another. For example, desktop computers or engineering workstation may be more likely to use one of Microsoft Windows, Linux, Unix, or Mac OSX. Laptop computers, which are usually a portable off-the-shelf device with fewer customization options, may be more likely to run Microsoft Windows or Mac OSX. Mobile devices may be more likely to run Android or iOS. However, these examples are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Enterprise network 170 may also include one or more servers, firewalls, routers, switches, security appliances, antivirus servers, or other useful network devices, which in an example may be virtualized within workload cluster 142. In this illustration, enterprise network 170 is shown as a single network for simplicity, but in some embodiments, enterprise network 170 may include a large number of networks, such as one or more enterprise intranets connected to the internet. Enterprise network 170 may also provide access to an external network, such as the Internet, via external network 172. External network 172 may similarly be any suitable type of network.

A workload cluster 142 may be provided, for example as a virtual cluster running in a hypervisor on a plurality of rack-mounted blade servers, or as a cluster of physical servers. Workload cluster 142 may provide one or more server functions, or one or more "microclouds" in one or more hypervisors. For example, a virtualization environment such as vCenter may provide the ability to define a plurality of "tenants," with each tenant being functionally separate from each other tenant, and each tenant operating as a single-purpose microcloud. Each microcloud may serve a distinctive function, and may include a plurality of virtual machines (VMs) of many different flavors, including agentful and agentless VMs.

It should be noted that some functionality of endpoint devices 110 may also be provided via workload cluster 142. For example, one microcloud may provide a remote desktop hypervisor such as a Citrix workspace, which allows users 120 operating endpoints 110 to remotely login to a remote enterprise desktop and access enterprise applications, workspaces, and data. In that case, endpoint 110 could be a "thin client" such as a Google Chromebook, running only a stripped-down operating system, and still provide user 120 useful access to enterprise resources.

One or more computing devices configured as a management console 140 may also operate on enterprise network 170. Management console 140 may provide a user interface for a security administrator 150 to define enterprise security policies, which management console 140 may enforce on enterprise network 170 and across client devices 110 and workload cluster 142. In an example, management console 140 may run a server-class operating system, such as Linux, Unix, or Windows Server. In other case, management console 140 may be provided as a web interface, on a desktop-class machine, or via a VM provisioned within workload cluster 142.

Secured enterprise 100 may communicate across enterprise boundary 104 with external network 172. Enterprise boundary 104 may represent a physical, logical, or other boundary. External network 172 may include, for example, websites, servers, network protocols, and other network-based services. In another example, secured enterprise 100 may simply be a family, with parents assuming the role of security administrator 150. The parents may wish to protect their children from undesirable content, such as pornography, adware, spyware, age-inappropriate content, advocacy for certain political, religious, or social movements, or forums for discussing illegal or dangerous activities, by way of non-limiting example. In this case, the parent may perform some or all of the duties of security administrator 150.

Workload cluster 142 may be configured to provide any suitable network services to client devices, such as client device 110 and end user device 180. For example, workload cluster 142 may be a rack-mount cloud system providing security and infrastructure services such as a firewall, antivirus, deep packet inspection, load balancing, and switching by way of nonlimiting example. Workload cluster 142 may also provide substantive network services, such as a corporate file server, database file system, intranet server, or a database server by way of nonlimiting example. An enterprise user 120 may use a client application 112 on client device 110 to access services on workload cluster 142 via enterprise network 170.

End user 160 may also access network resources. End user 160 may operate an end user application 162 on end user device 180, and access workload cluster 142 via external network 172 and enterprise network 170. In accordance with good corporate security practice, network from outside of secured enterprise 100 may be segregated from corporate network traffic, such as by placing enterprise traffic and external traffic on different subnetworks.

Workload cluster 142 may provide to external end users 160 various suitable network services, such as a website over hypertext transfer protocol (HTTP), e-mail over simple mail transport protocol (SMTP), file sharing via file transfer protocol (FTP), secure FTP (SFTP), or virtual shells via protocols such as telnet or secure shell (SSH).

Note that while end user 160 and corporate user 120 are disclosed here as two separate entities by way of nonlimiting example, strict segregation is not required. An end user 160 may also be a corporate user, and may access corporate resources via a remote client such as Citrix or a remote desktop protocol (RDP). Corporate user 120 may also be a guest user with less than full access to enterprise resources.

To provide a simplified example by way of illustration, this specification will assume that workload cluster 142 is a single workload server 142 having one or more network interface cards (NICs). However, the methods disclosed herein can be scaled to any appropriate number of servers configured in any appropriate manner, such as standalone servers, service appliances, individual servers operating multiple protocols, or a plurality of virtual servers operating on one or a plurality of physical devices.

In this example, workload server 142 hosts both an HTTP web server receiving traffic on port 80, and an SMTP mail server receiving traffic on port 25. Workload server 142 may open a unique communication "socket" or other logical connection for each connection with a client device. Thus, for example, if 100,000 users, either corporate users 120 or end users 160, or any combination thereof, are accessing a website at a given time, then 100,000 HTTP sockets will be open on port 80. Similarly, if 50,000 e-mail users are accessing e-mail services, then 50,000 SMTP sockets will be open on port 25. These quantities are provided for illustration only. Smaller or independent servers may have far fewer simultaneous sockets open, while large, popular web services may have many more sockets open.

Figure 4:
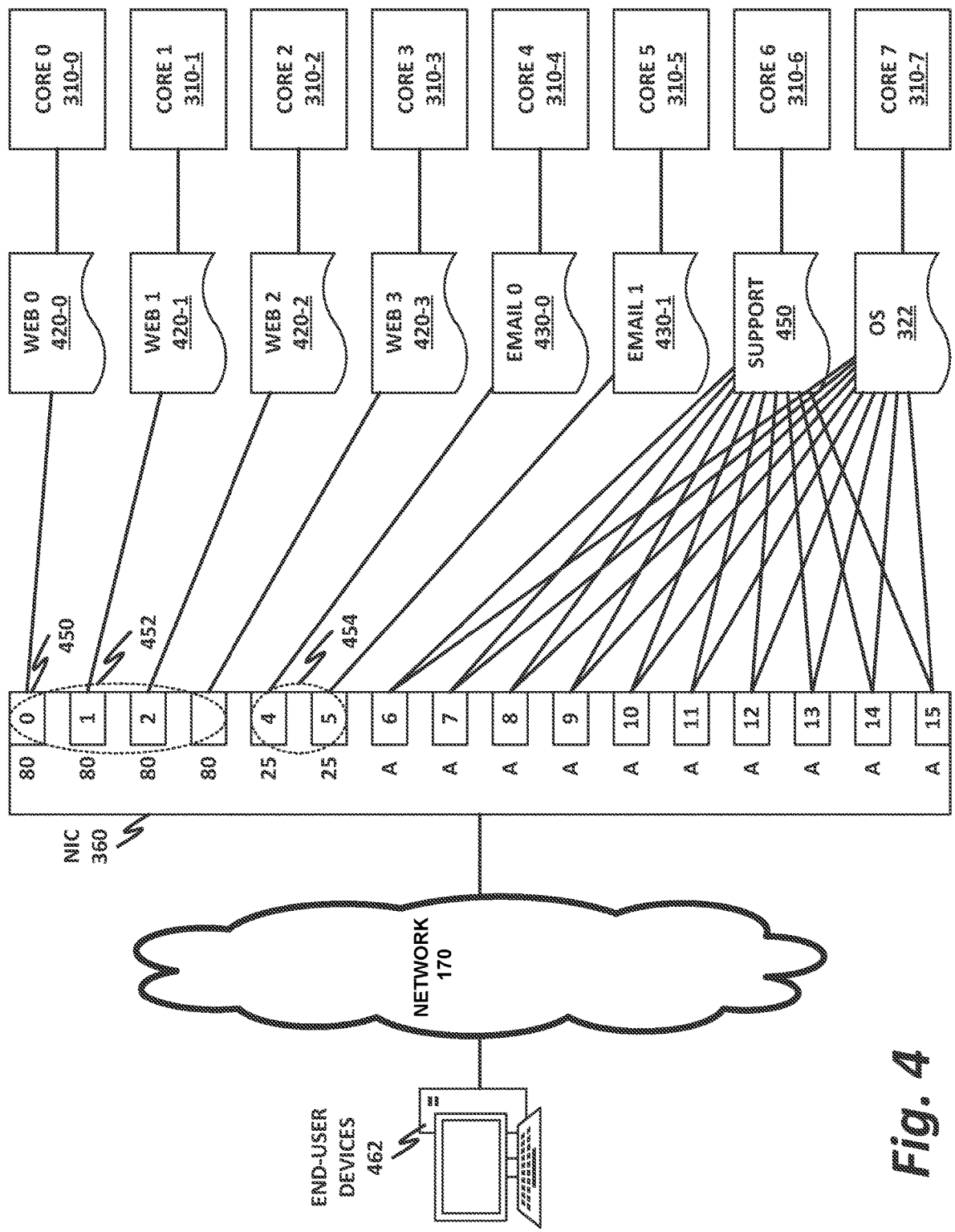
FIG. 4 is a block diagram of a network queueing system according to one or more examples of the present specification.
Figure 5:
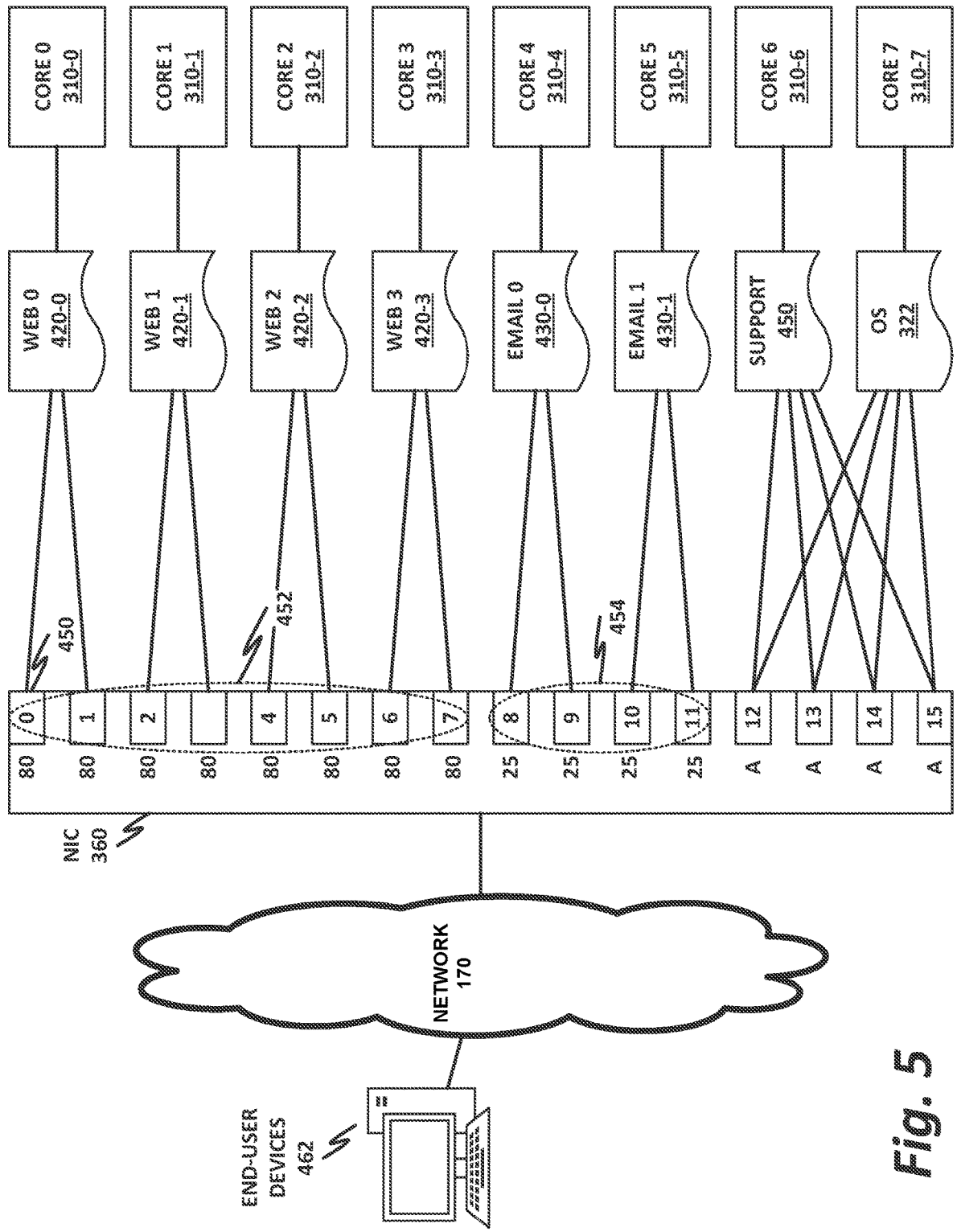
FIG. 5 is a block diagram of a network queueing system according to one or more examples of the present specification.
Figure 7:
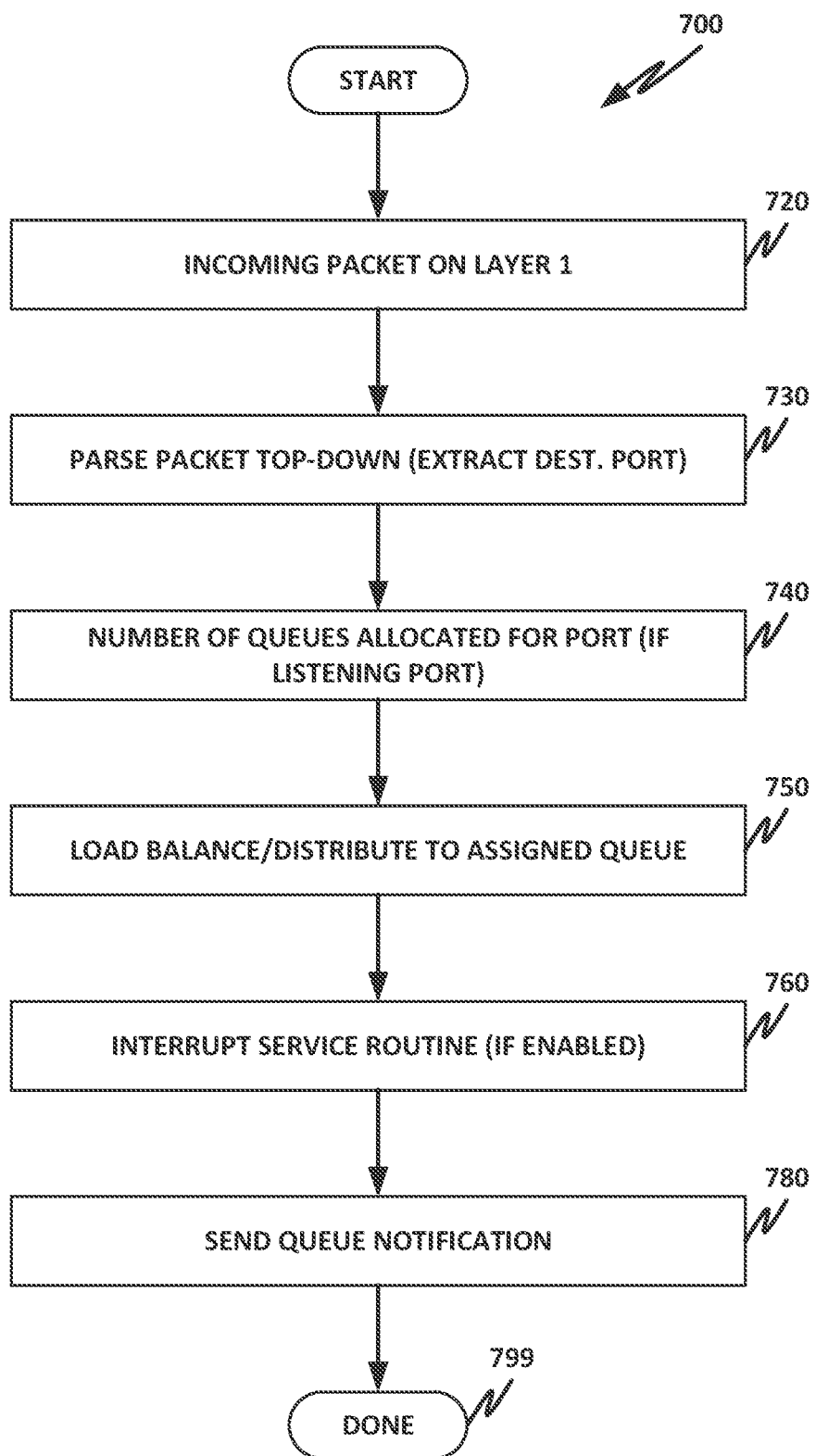
FIG. 7 is a flow chart of a method performed by a network device according to one or more examples of the present specification.
Figure 8:
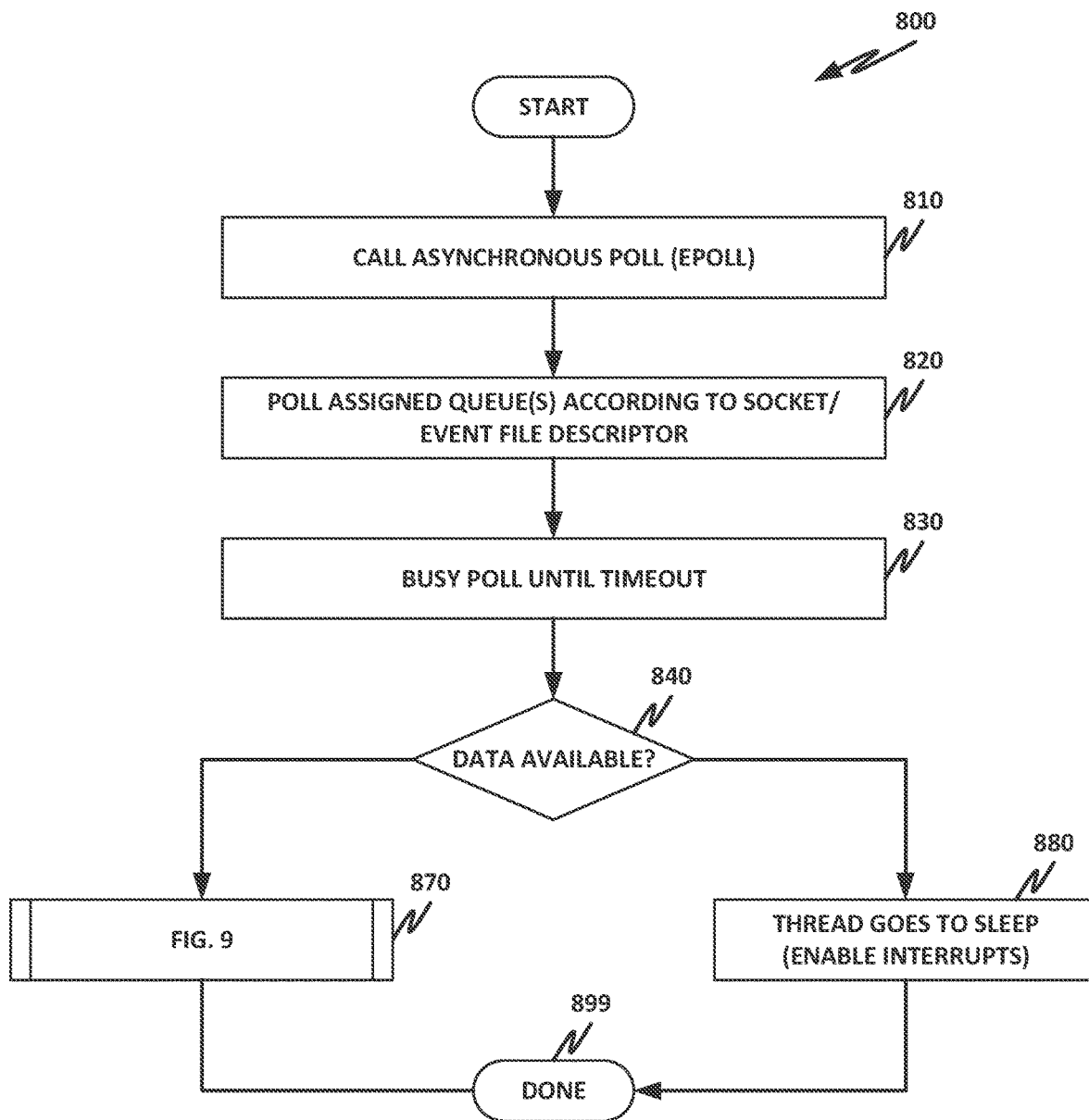
FIG. 8 is a flow chart of a method performed by an application according to one or more examples of the present specification
Figure 9:
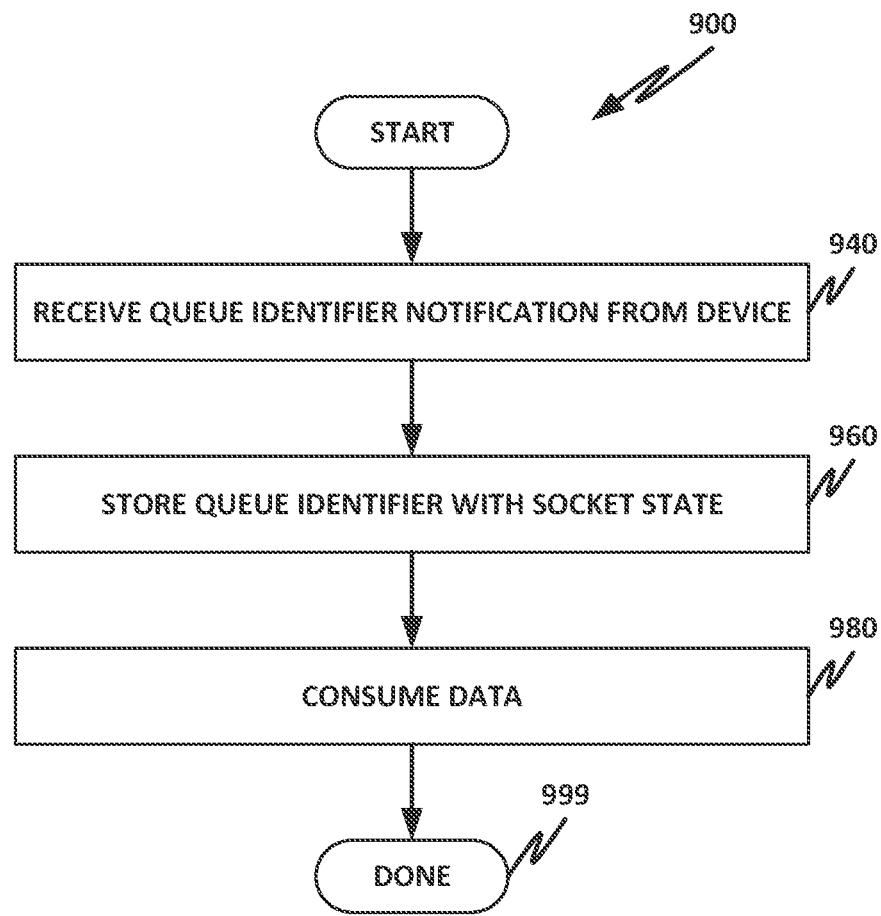
FIG. 9 is a flow chart of a method performed by an application according to one or more examples of the present specification.

As illustrated in this specification, with a large number of concurrent connections, queueing can be a substantial challenge. Certain embodiments of traditional "bottom-up" hash-based queueing such as RSS, in which a packet is hashed starting with the lower levels of the OSI network model, may result in substantial latency due to traffic from other applications sharing the same queues. Thus, this specification provides a system and method for providing application-level network queuing to reduce latency and improve performance. Example logical embodiments are illustrated in FIGS. 4 and 5, while example methods are illustrated in FIGS. 7-9.

Figure 2:
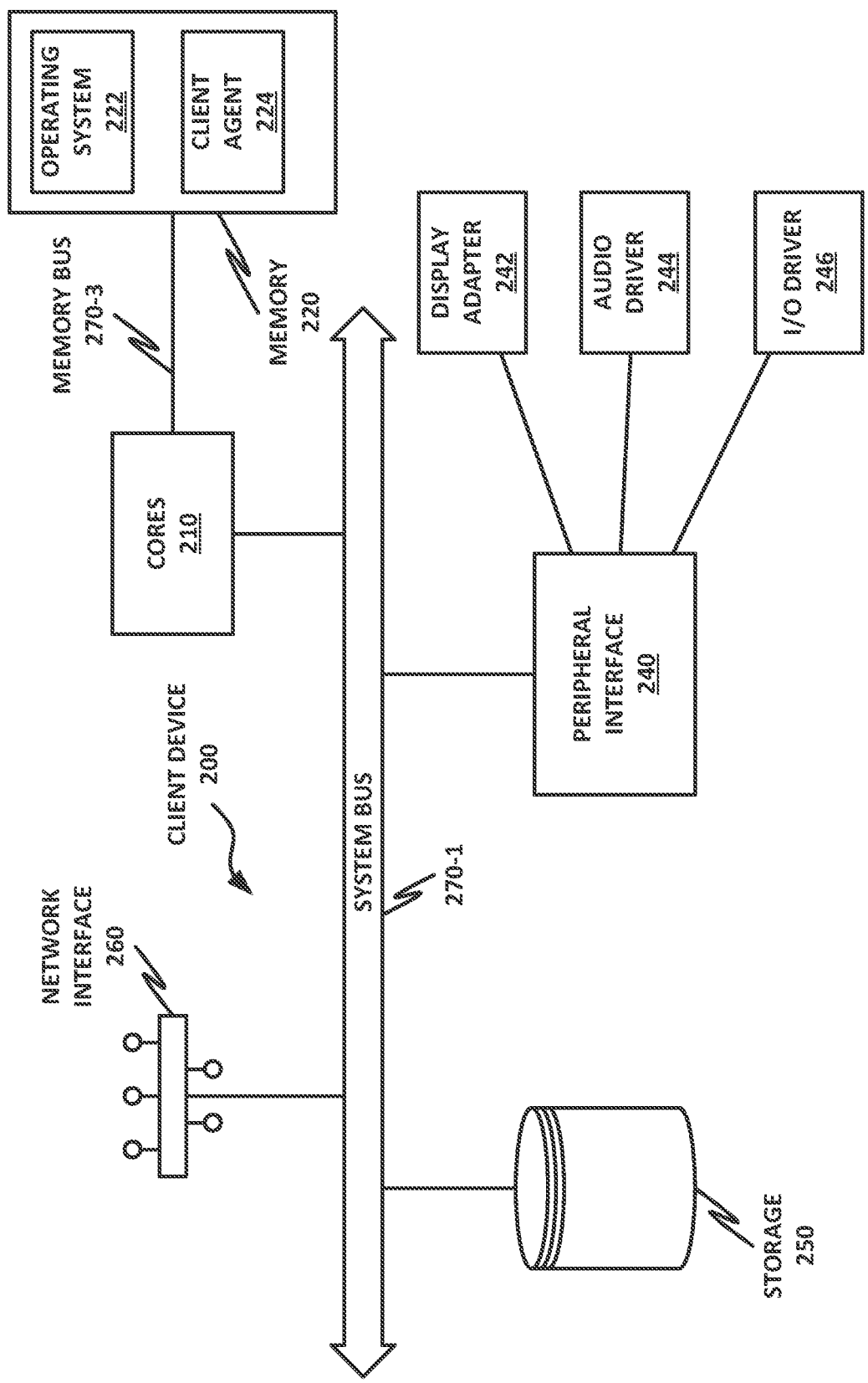
FIG. 2 is a block diagram of a client device according to one or more examples of the present specification.

FIG. 2 is a block diagram of client device 200 according to one or more examples of the present specification. Client device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device or apparatus for processing and communicating data. Any computing device may be designated as a host on the network. Each computing device may refer to itself as a "local host," while any computing device external to it may be designated as a "remote host."

In certain embodiments, client devices 110 may all be examples of client devices 200.

Client device 200 includes a processor 210 connected to a memory 220, having stored therein executable instructions for providing an operating system 222 and at least software portions of a client agent 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3 (or other similar memory interconnect). To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client agent 224. Many other configurations are also possible, and are intended to be encompassed within the broad scope of this specification.

Network interface 260 may be provided to communicatively couple client device 200 to a wired or wireless network, and may be a network interface card (NIC), host fabric interface (HFI), or any other suitable device. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client agent 224, in one example, is operable to carry out computer-implemented methods as described in this specification. Client agent 224 may include one or more tangible non-transitory computer-readable mediums having stored thereon executable instructions operable to instruct a processor to provide a client agent 224. As used throughout this specification, an "engine" includes any combination of one or more logic elements, of similar or dissimilar species, operable for and configured to perform one or more methods provided by the engine. Thus, client agent 224 may comprise one or more logic elements configured to provide methods as disclosed in this specification. In some cases, client agent 224 may include a special integrated circuit designed to carry out a method or a part thereof, and may also include software instructions operable to instruct a processor to perform the method. In some cases, client agent 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client agent 224 may also include other hardware and software, including configuration files, registry entries, and interactive or user-mode software by way of non-limiting example.

In one example, client agent 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client agent 224 to provide the desired method.

Client agent 224 may provide an interface and services for an end user, such as corporate user 120 or customer 160 to access services provided by a server 300. For example, client agent 224 may be or comprise a web browser, and e-mail client, or a client for a program such as file transfer protocol (FTP), telnet, secure shell (SSH), network time protocol (NTP), or any other suitable network-based program.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
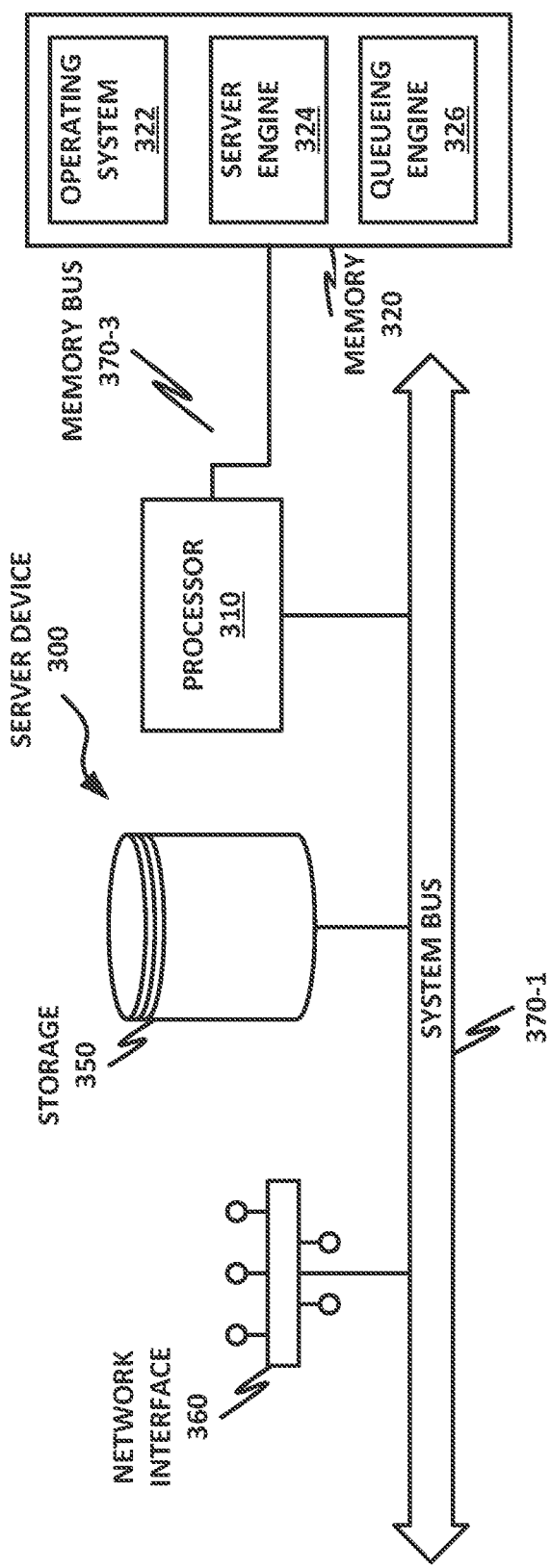
FIG. 3 is a block diagram of a server device according to one or more examples of the present specification.

FIG. 3 is a block diagram of a server-class device 300 according to one or more examples of the present specification. Server 300 may be any suitable computing device or apparatus, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes processor 310, which may include multiple cores, and which may be connected to a memory 320, having stored therein executable instructions for providing an operating system 322 and at least software portions of a server engine 324. Other components of server 300 include a storage 350, and network interface 360. As described in FIG. 2, each logical block may be provided by one or more similar or dissimilar logic elements.

In an example, processor 310 is communicatively coupled to memory 320 via memory bus 370-3, which may be for example a direct memory access (DMA) bus or other suitable memory interconnect. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of server engine 324.

Network interface 360 may be provided to communicatively couple server 140 to a wired or wireless network, and may include one or more logic elements as described in FIG. 2. Network interface 360 may be a NIC, HFI, or any other suitable device.

Server engine 324 is an engine as described in FIG. 2 and, in one example, includes one or more logic elements operable to carry out computer-implemented methods as described in this specification. Software portions of server engine 324 may run as a daemon process.

Server engine 324 may include one or more non-transitory computer-readable mediums having stored thereon executable instructions operable to instruct a processor to provide a security engine. At an appropriate time, such as upon booting server 140 or upon a command from operating system 322 or a user 120 or security administrator 150, processor 310 may retrieve a copy of server engine 324 (or software portions thereof) from storage 350 and load it into memory 320. Processor 310 may then iteratively execute the instructions of server engine 324 to provide the desired method.

Server engine 324 may be any suitable server program, including a daemon, for providing a network-based service. These could include, by way of nonlimiting example, an HTTP or web server, an e-mail server, an FTP server, telnet server, SSH server, NTP server, or any other suitable server. In certain embodiments, server engine 324 is the "application" of ALNQ as described herein. In certain embodiments, server engine 324 may perform the method of FIG. 8 or related methods.

A queuing engine 326 may also be provided, and may be an engine as described herein. Queuing engine 326 may be configured to provide ALNQ queuing services, including performing the method of FIG. 7 or related methods.

FIG. 4 is a block diagram of selected elements of a server 300 according to one or more examples of the present specification. In this example, NIC 360 connects server 300 to network 170, which in its turn is communicatively coupled to a plurality of end users devices 462. There may be many end-user devices 462, including thousands or more of end-user devices 462. End-user devices 462 access server 300 for the purpose of accessing services provided by server 300, such as via server engine 324 or any other appropriate application.

In this example, server 300 includes eight cores 310. Each core 310 may be dedicated to a different service or thread of a service as appropriate, though that is a nonlimiting example only, and it is also possible for processors 310 to share different processes. In this example, a web server 420 is provided. Web server 420 is divided into four separate threads. Specifically, web 0 420-0 runs on core 0 310-0. Web 1 420-1 runs on core 1 310-1. Web 2 420-2 runs on core 2 310-2. Web 3 420-3 runs on core 3 310-3.

An email server 430 is also provided. In this example, two cores are dedicated to email server 430. Specifically, email 0 430-0 runs on core 4 310-4. Email 1 430-1 runs on core 5 310-5.

The last two cores are committed to support background processes. Specifically, support applications 450 run on core 6 310-6. Operating system 322 runs on core 7 310-7. It should be understood that the number of cores, the number of threads, and the distribution of threads among the several cores is provided by way of nonlimiting example. In other embodiments, other configurations are possible. In some cases, a machine may have many more cores, and many more threads. In other cases, a machine may have fewer cores and fewer threads. Any suitable combination of cores and threads is available.

In this example, NIC 360 exposes queues 450 numbered 0 through 15. According to examples disclosed in this specification, queues 0 through 3, comprising group 452, are dedicated to traffic on port 80. Queues 4 and 5, comprising group 454, are dedicated to traffic on port 25. Queues 6 through 15 are considered auxiliary queues, and are allocated for use by operating system 322 and support application 450.

When an incoming packet comes from network 170 to NIC 360, queuing engine 326 inspects the packet in a top-down fashion. In other words, queuing engine 326 inspect the upper layer information first. In this example, queuing engine 326 is specifically looking at which logical port the packet is designated for. In an example, a packet is assigned to group 452 if and only if it is port 80 traffic. Thus, all port 80 traffic is assigned to group 452, and no traffic that is not port 80 traffic is assigned to group 452.

Similarly, if and only if incoming traffic is found to be email traffic on port 25, the traffic is assigned to group 454. In other words, all port 25 traffic is assigned to group 454, and no traffic that is not group that is not port 25 traffic is assigned to group 454.

Any traffic that is not either port 80 or port 25 is assigned to one of the auxiliary ports, numbered 6 through 15, according to standard assignment methods. This may include hashing or similar. This means that web server 420 knows that all of its traffic will appear in group 452, and that no outside traffic will appear in the group. Similarly, email server 430 knows that all of its traffic will appear in group 454, and that no outside traffic will appear in the group. Conversely, operating system 322 knows that those two groups are completely "owned" by their respective applications, so OS 322 can in appropriate circumstances circumvent some of its usual security procedures and let those applications handle their own internal security.

Assignment of traffic to auxiliary ports 6 through 15 may be accomplished with any suitable method, including in some embodiments prior art methods such as RSS, Flow Director, or similar. Similarly, once a packet has been assigned to either group 452 or 454, assignment of the packet to queues within the group may be accomplished by any suitable means, including RSS, Flow Director, or equivalent.

Advantageously, because it is known that group 453 includes only traffic on port 80 designated for web server 420, the operating system now has the flexibility to impose application specific policies and optimizations directly. As an example it could pass the queues directly to the application without having to consider security violations from having traffic from other applications.

FIG. 5 is a view of an additional embodiment according to one or more examples of the present specification. In the example of FIG. 5, groups 452 and 454 are twice as large as they are in the example of FIG. 4. This is to illustrate that while one-to-one mapping between queues and threads is possible, n-to-one mapping is also possible, for any n greater than 1.

In the example of FIG. 5, groups 452 and 454 both reserve two separate queues for each thread. This illustrates the principle that web server 420 and email server 430 may be relatively more important to the function of server 300 than support function 450 and operating system 322. Thus, it may be advantageous in certain embodiments to allocate additional queues for each thread, to avoid bottlenecks in the communication. Thus, in this example, queues 0 and 1 are reserved for web server thread 420-0. Queues 2 and 3 are for web server thread 420-1. Queues 4 and 5 are for web server thread 420-2. Queues 6 and 7 are for web server thread 420-3.

Similarly, queues 8 and 9 are for email server thread 430-0. Queues 10 and 11 are for email server thread 430-1.

Finally, queues 12 through 15 are allocated for general purposes, and may be used for support function 450 and operating system 322, including all traffic not on port 80 or 25.

Note that the examples of FIG. 4 and FIG. 5 are a nonlimiting example of a potential configuration. Other configurations are possible, including a configuration in which the number of queues exactly matches the number of cores, or where the number of queues is related to the number of cores by a non-integer function.

Figure 6:
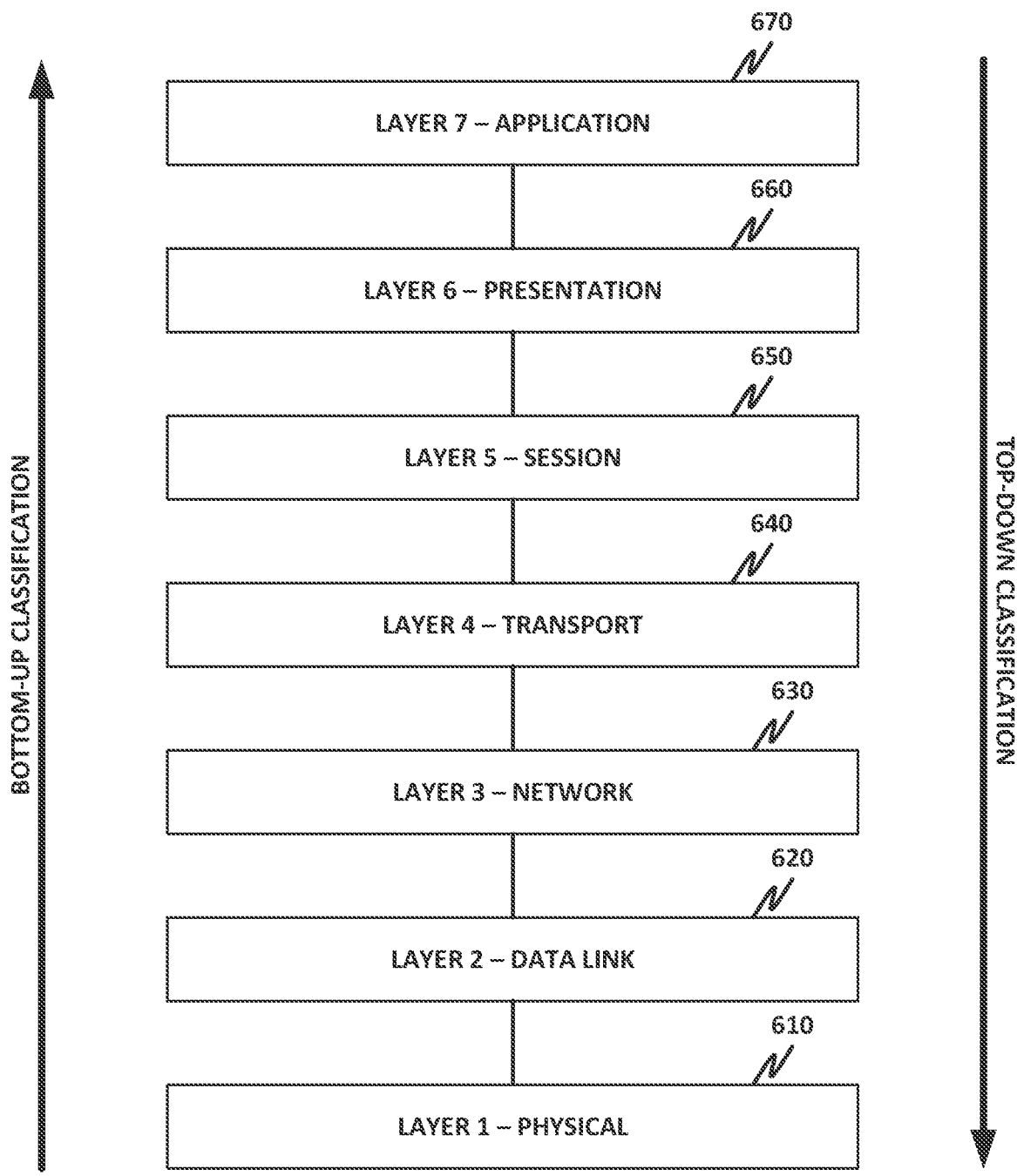
FIG. 6 is a block diagram of an Open Systems Interconnection model (OSI) seven-layer stack according to one or more examples of the present specification.

FIG. 6 is a block diagram illustration of a traditional OSI network stack model. In the traditional OSI model, the network stack includes seven layers, specifically physical layer 610, data link layer 620, network layer 630, transport layer 640, session layer 650, presentation layer 660, and application layer 670. The OSI model is presented here for purposes of illustration, but it should be understood that the OSI model is a nonlimiting example only. The "internet protocol suite" (often referred to as TCP/IP) is also commonly used. TCP/IP layers may be similar but not identical to OSI layers.

The seven layers of the OSI model are described briefly here for the purpose of context for relevant portions of the present description. The layers are, in summary:
   a. Physical Layer 610—The physical layer (layer 1) provides networking hardware and transmission technologies. This layer includes physical wires, clocks, voltages, and other physical structures to provide the transmission of raw bits, rather than logical data packets. Each bit stream may be grouped into code words or symbols and converted to a physical signal that is transmitted over a hardware transmission medium. The physical layer provides an electrical, mechanical, and procedural interface to the transmission medium. Within the context of the seven-layer model, the physical layer translates logical communications requests from the data link layer into hardware-specific operations to effect transmission or reception of electronic signals.
   b. Data Link Layer 620—The data link layer (layer 2) is the protocol layer that transfers data between adjacent network nodes to provide functional and procedural transfer of data between network entities. In certain embodiments, the data link layer also provides error detection and correction. The basic data unit at this layer is a data link frame, which is not intended to cross a local network boundary. Routing between networks and global addressing are performed at higher layers. This allows the data link layer to focus on local delivery, addressing, and media arbitration. Data-link protocols specify how devices detect and recover from collisions, and may provide mechanisms to reduce or prevent them. Thus, in certain existing architectures, queuing of packets is based on using hashes of values or absolute values available at this layer, such as a MAC address.
   c. Network Layer 630—Layer 3 is the network layer. The network layer is responsible for packet forwarding, including routing through intermediate routers. The network layer provides the functional and procedural means of transferring variable-length data sequences from a source to a destination host via one or more networks, while maintaining the quality of service functions. Functions of the network layer include:
      i. Connection model: connectionless communication. For example, IP is connectionless, in that a datagram can travel from a sender to a recipient without the recipient having to send an acknowledgement. Connection-oriented protocols exist at other, higher layers of the OSI model.
      ii. Host addressing. Every host in the network must have a unique address that determines where it is. This address is normally assigned from a hierarchical system. In TCP/IP, this is an IP address, either 32-bit IPv4 (e.g., 192.168.1.1), or 128-bit IPv6 (e.g., 2001: 0DB8:AC10:FE01:0000:0000:0000:0000). An IPv4 address may be either globally unique, or locally unique (i.e., if it is used in a local subnetwork). An IPv6 address is intended to be globally unique.
      iii. Message forwarding. Since many networks are partitioned into subnetworks and connect to other networks for wide-area communications, networks use specialized hosts, called gateways or routers, to forward packets between networks. This is also of interest to mobile applications, where a user may move from one location to another, and it must be arranged that his messages follow him.
      iv. The network layer responds to service requests from the transport layer and issues service requests to the data link layer.
   d. Transport Layer 640—Layer 4 is the transport layer, which provides end-to-end or host-to-host communication services for applications. The transport layer provides services such as connection-oriented data stream support, reliability, flow control, and multiplexing. Simple connectionless (stateless) implementations may use user datagram protocol (UDP) at Layer 4, while connection-oriented (stateful) implementations may use transmission control protocol (TCP). Datagram Congestion Control Protocol (DCCP) and Stream Control Transmission Protocol (SCTP) are also provided by way of nonlimiting example.
   e. Session Layer 650—Layer 5 is the session layer. The session layer opens, closes, and manages sessions between end-user applications, such as end-user application 162 or client application 112 of FIG. 1 and a web server 420 of FIG. 4. Communication sessions consist of requests and responses that occur between applications. Session-layer services are commonly used in application environments that make use of remote procedure calls (RPCs). The session layer may respond to service requests from the presentation layer and issues service requests to the transport layer.
   f. Presentation Layer 660—Layer 6 is the presentation layer, also called the syntax layer. The presentation layer is responsible for the delivery and formatting of information to the application layer for further processing or display, including serialization of data structures into flat byte strings. This layer handles syntactical differences in data representation within the end-user systems. For example, EBCDIC-coded data may be converted to ASCII for use with an application. This layer also handles issues of diverse data types. For example, Pascal-style text strings, with an explicit integer length, may need to be interpreted differently from C-style null-terminated strings. Where appropriate, encryption may also be performed at this layer.
   g. Application Layer 670—Layer 7 is the application layer. In the OSI model, layer 7 is responsible for displaying received information to the user.

In certain existing networking architectures, incoming traffic to a network interface such as NIC 360, traffic is assigned to queues such as queues 450.

FIG. 7 is a flowchart of a method 700 performed by queuing engine 326, particularly for received packets, according to one or more examples of the present specification.

In block 720, NIC 360 receives an incoming packet on. This means that the physical interface receives electrical signals providing an incoming data packet.

In block 730, queuing engine 326 parses the packet in a top-down manner. Specifically, in this example, queuing engine 326 extracts the destination port for the packet, though other values may be used.

In block 740, queuing engine 326 determines whether the port is configured a "listening" port. If so, it identifies a number of queues in the group allocated for this port.

Block 750, queuing engine 326 load balances or distributes the packet to its assigned queue. For example, if group 452 has been designated for HTTP traffic, and if the incoming packet is on port 80, then queuing engine 326 may assign the packet to one of the cues in group 452 according to an appropriate load-balancing algorithm. RSS, Flow Director, or similar may be used to identify the specific queue to assign the packet into. The packet may then be made available via direct memory access (DMA), so that it can be accessed independently of the processor where appropriate.

In block 760, if interrupts are enabled (e.g., rather than "busy polling,") and the interrupt throttling timer has expired, queuing engine 326 sends an interrupt to the host. In other words, the interrupt driver does not trigger an interrupt with every incoming packet. Rather, interrupts are triggered only when a threshold of packets or time has been reached. An interrupt service routine may then signal server engine 324 directly. Interrupts are asserted depending on the triggering logic, and if asserted signal the application. In either case, polling from server engine 324 may trigger the packet flow.

In block 780, queuing engine 326 sends a queuing notification to the appropriate process, such as a thread of server engine 324. For example, in the case of web server 420, queuing engine 326 may send a notification to the appropriate thread such as thread 0 420-0 of the process. Specifically, the driver may pick the packet from the queue, and pass along with the packet, opaque information that identified the specific queue. This information is stored in the sockets layer and available to the application.

In block 799, the method is done.

FIG. 8 is a flowchart of a method 800 performed by an application, such as server engine 324, according to one or more examples of the present specification.

In block 810, the application thread makes and asynchronous poll call. For example the Linux operating system provides a call known as EPOLL. If using EPOLL or similar, the application gets the opaque queue identifier for the socket it is watching for and checks to see if that it matches the queue identifier for other sockets it is watching for a particular event file descriptor. If so, it adds this socket to the watch list. Otherwise, it hands the socket to the event file descriptor that has the matching queue identifier and is added to its watch list. In an example, a single thread operates on a single event file descriptor. Thus, creating the match of watching sockets with the same queue identifier streamlines the traffic flow without interference from other applications.

In block 820, the application thread polls its assigned queues according to the socket/event file descriptors provided by asynchronous polling. If the thread was asleep because there is no data (and consequently, no work for it do), a wakeup may be performed directly on the sleeping thread, allowing the thread to come back and pull packets from its queues. In other words, protocol and descriptor processing occur in the context of the thread, not in the context of the interrupt, or deferred procedure call (DPC) (Windows)/SoftIRQ (Linux), which is scheduled as a result of an interrupt. In doing so, scheduling affinities are preserved. The scheduler wakeup of the application (such as server engine 326) keeps all shared kernel data structures associated with packet delivery and transmission in the same caching/scheduling domain, aligning with the scheduling policies of an operating system/hypervisor.

In block 830, the application thread performs busy pulling until there is a timeout. Busy polling sockets may be streamlined to pull packets directly from the application-specific queues.

In decision block 840, if data are available, then in block 870, method 900 of FIG. 9 is performed.

If data are not available, then in block 880, the thread goes to sleep with interrupts enabled.

In block 899, the method is done.

FIG. 9 is a flowchart of a method 900 disclosing additional details of data consumption according to one or more examples of the present specification.

In block 940, NIC 360 stamps a queue identifier token associated with a packet, and propagates the identifier up the network stack. Application 324 then receives the queue identifier from NIC 360. Note that if there is more than one NIC 360, this may also include a device identifier (for example, NIC 0, queue 1; NIC 1, queue 1; etc.).

In block 960, the socket layer stores the queue identifier as part of its state. Again, the queue identifier may be device specific.

In block 980, application 324 consumes the data.

In block 999, the method is done.

Figure 10:
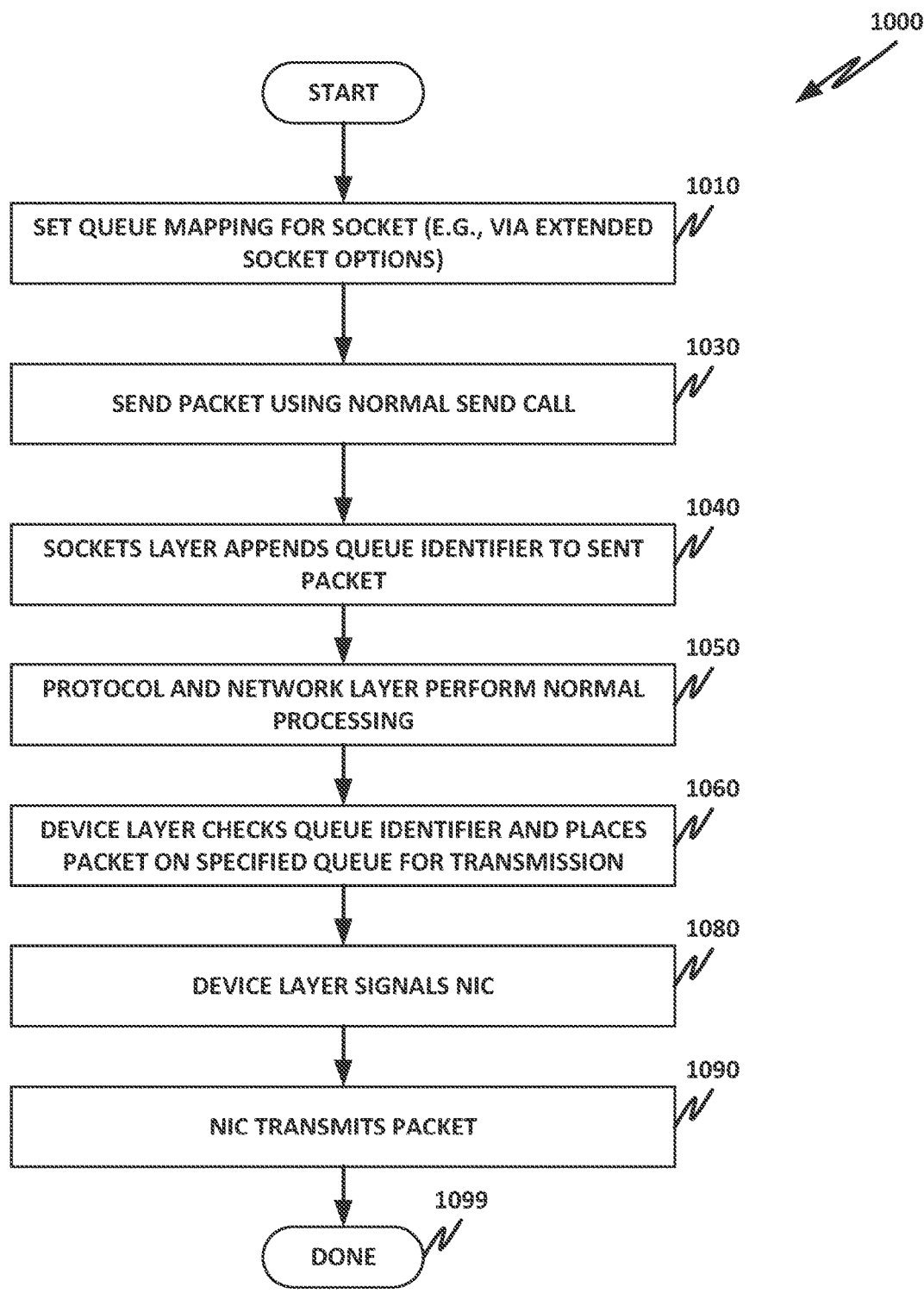
FIG. 10 is a flow chart of a transmit operation according to one or more examples of the present specification.

FIG. 10 is a flow chart of a method 1000 of performing a transmit operation with ALNQ according to one or more examples of the present specification. This method is understood as a nonlimiting example, and in particular, specific network layers are assigned operations in this flow chart by way of illustration.

In block 1010, application 324 may set queue mapping for the socket, such as via extended socket options. Note that this may be necessary only if the send-to queue is different from the last transmit operation.

In block 1030, application 324 sends the packet using the normal socket SEND call.

In block 1040, the socket layer of the network stack appends the queue identifier to the sent packet.

In block 1050, the protocol and network layers perform their normal, known functions.

In block 1060, the device layer checks the queue identifier and places the packet on a specified queue for transmission.

In block 1080, the device layer signals the appropriate NIC 360 that the packet is ready for transmission.

In block 1090, NIC 360 transmits the packet.

In block 1099, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure. Note that client device 200 and server 300 may both be examples of computing apparatuses or other computing devices.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 310, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 350 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 320 and storage 350, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 310 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for"

or "steps for" are specifically used in the particular claims; and (b) does not intend, by any statement in the specification, to limit this disclosure in any way that is not otherwise expressly reflected in the appended claims.

Example Implementations

There is disclosed in one example a network interface card (NIC), comprising: an ingress interface to receive incoming traffic; a plurality of queues to queue incoming traffic; an egress interface to direct incoming traffic to a plurality of server applications; and a queuing engine, including logic to: uniquely associate a queue with a selected server application; receive an incoming network packet; determine that the selected server application may process the incoming network packet; and assign the incoming network packet to the queue.

There is further disclosed an example NIC, wherein determining that the selected server application may process the incoming network packet comprises inspecting an application identifier of the incoming network packet.

There is further disclosed an example NIC, wherein the application identifier comprises a port number.

There is further disclosed an example NIC, further comprising means for notifying the selected server application of the assigning.

There is further disclosed an example NIC, further comprising means to enable the selected server application to bypass an interrupt mechanism and to perform per-thread, non-interfering busy polling.

There is further disclosed an example NIC, wherein the queuing engine is further to receive a queue mapping for a socket via an extended socket option.

There is further disclosed an example NIC, wherein the queueing engine further includes logic to uniquely associate a plurality of queues with the selected server application.

There is further disclosed an example NIC, wherein the queueing engine further includes logic to uniquely assign a second queue to a second selected server application.

There is further disclosed an example NIC, wherein the queueing engine further includes logic to assign a support queue to handle incoming packets not directed to a queue uniquely assigned to a server application.

There is further disclosed an example NIC, wherein the queueing engine further includes logic to assign a plurality of support queues.

There is further disclosed an example NIC, wherein the plurality of support queues number less than a sum of queues uniquely assigned to one or more selected server applications.

There is also disclosed in one example a tangible, non-transitory storage medium having stored thereon instructions to instruct a network interface card (NIC) to: deterministically associate an ingress queue of the NIC with a server function to be serviced by the NIC; receive an incoming network packet on an ingress interface of the NIC; determine that the server function may process the incoming network packet; and assign the incoming network packet to the queue.

There is further disclosed an example of a tangible, non-transitory storage medium, wherein determining that the selected server application may process the incoming network packet comprises inspecting an application identifier of the incoming network packet.

There is further disclosed an example of a tangible, non-transitory storage medium, wherein the application identifier comprises a port number.

There is further disclosed an example of a tangible, non-transitory storage medium, wherein the queueing engine further includes logic to uniquely associate a plurality of queues with the selected server application.

There is further disclosed an example of a tangible, non-transitory storage medium, wherein the queueing engine further includes logic to uniquely assign a second queue to a second selected server application.

There is further disclosed an example of a tangible, non-transitory storage medium, wherein the queueing engine further includes logic to assign a support queue to handle incoming packets not directed to a queue uniquely assigned to a server application.

There is also disclosed an example method of providing deterministic per-application packet queueing, comprising: uniquely associating one or more ingress queues of a network interface card (NIC) with a server function to be serviced by the NIC; receiving an incoming network packet on an ingress interface of the NIC; determining that the network packet is directed to the associated server function; and assigning the incoming network packet to a queue selected from the one or more uniquely associated queues.

There is further disclosed an example method, wherein determining that the network packet is directed to the associated server function comprises inspecting an application identifier of the incoming network packet.

There is further disclosed an example method, wherein the application identifier comprises a port number.

What is claimed is:

1. At least one non-transitory storage medium storing instructions to be executed by at least one server system, the instructions, when executed by the at least one server system, resulting in the at least one server system being configurable to perform operations comprising:
    assigning, based upon respective application-specific quality of service-related data:
       one or more queues to respective applications; and/or
       respective portions of network traffic to the one or more queues;
    wherein:
       the respective application-specific quality of service-related data is associated with the respective applications;
       the one or more queues are for use in application-level steering of the respective portions of the network traffic;
       the respective application-specific quality of service-related data is configurable to be based upon respective application-associated identifier values;
       the respective application-associated identifier values are configurable to be based upon respective port numbers associated with the respective applications;
       the assigning is configurable to be associated with at least one tail latency;
       the respective application-specific quality of service-related data is to be generated based upon policy-related data;
       the policy-related data comprises quality of service policy data; and
       the policy-related data is to be defined, at least in part, via a management user interface to be provided using an operating system.

2. The at least one non-transitory storage medium of claim 1, wherein:
    the policy-related data comprises user-definable security policy data; and the user-definable security policy data is to be implemented in association with at least one operating system of the at least one server system.

3. The at least one non-transitory storage medium of claim 1, wherein:
the respective applications are associated with tenant-associated virtual machines;
the respective applications comprise email and/or web applications; and
the at least one server system is configurable to implement receive-side scaling with respect to queue assignment associated with the respective applications.

4. The at least one non-transitory storage medium of claim 3, wherein:
the at least one server system is configurable to implement network traffic load balancing in association with the respective applications; and
the at least one server system comprises a scalable distributed computer system.

5. The at least one non-transitory storage medium of claim 4, wherein:
the one or more queues are configurable to be aligned with application threads.

6. The at least one non-transitory storage medium of claim 1, wherein:
the respective port numbers comprise port 25 and/or port 80; and
the respective port numbers are to be used as respective queue assignment key values.

7. A method implemented using at least one server system, the method comprising:
assigning, based upon respective application-specific quality of service-related data:
one or more queues to respective applications; and/or
respective portions of network traffic to the one or more queues;
wherein:
the respective application-specific quality of service-related data is associated with the respective applications;
the one or more queues are for use in application-level steering of the respective portions of the network traffic;
the respective application-specific quality of service-related data is configurable to be based upon respective application-associated identifier values;
the respective application-associated identifier values are configurable to be based upon respective port numbers associated with the respective applications;
the assigning is configurable to be associated with at least one tail latency;
the respective application-specific quality of service-related data is to be generated based upon policy-related data;
the policy-related data comprises quality of service policy data; and
the policy-related data is to be defined, at least in part, via a management user interface to be provided using an operating system.

8. The method of claim 7, wherein:
the policy-related data comprises user-definable security policy data; and
the user-definable security policy data is to be implemented in association with at least one operating system of the at least one server system.

9. The method of claim 7, wherein:
the respective applications are associated with tenant-associated virtual machines;
the respective applications comprise email and/or web applications; and
the at least one server system is configurable to implement receive-side scaling with respect to queue assignment associated with the respective applications.

10. The method of claim 9, wherein:
the at least one server system is configurable to implement network traffic load balancing in association with the respective applications; and
the at least one server system comprises a scalable distributed computer system.

11. The method of claim 10, wherein:
the one or more queues are configurable to be aligned with application threads.

12. The method of claim 7, wherein:
the respective port numbers comprise port 25 and/or port 80; and
the respective port numbers are to be used as respective queue assignment key values.

13. At least one server system comprising:
processor circuitry;
storage storing instructions to be executed by the processor circuitry, the instructions when executed by the processor circuitry resulting in the at least one server system being configurable to perform operations comprising:
assigning, based upon respective application-specific quality of service-related data:
one or more queues to respective applications; and/or
respective portions of network traffic to the one or more queues;
wherein:
the respective application-specific quality of service-related data is associated with the respective applications;
the one or more queues are for use in application-level steering of the respective portions of the network traffic;
the respective application-specific quality of service-related data is configurable to be based upon respective application-associated identifier values;
the respective application-associated identifier values are configurable to be based upon respective port numbers associated with the respective applications;
the assigning is configurable to be associated with at least one tail latency;
the respective application-specific quality of service-related data is to be generated based upon policy-related data;
the policy-related data comprises quality of service policy data; and
the policy-related data is to be defined, at least in part, via a management user interface to be provided using an operating system.

14. The at least one server system of claim 13, wherein:
the policy-related data comprises user-definable security policy data; and
the user-definable security policy data is to be implemented in association with at least one operating system of the at least one server system.

15. The at least one server system of claim 13, wherein:
the respective applications are associated with tenant-associated virtual machines;

the respective applications comprise email and/or web applications; and the at least one server system is configurable to implement receive-side scaling with respect to queue assignment associated with the respective applications.

16. The at least one server system of claim 15, wherein:

the at least one server system is configurable to implement network traffic load balancing in association with the respective applications; and the at least one server system comprises a scalable distributed computer system.

17. The at least one server system of claim 16, wherein:

the one or more queues are configurable to be aligned with application threads.

18. The at least one server system of claim 13, wherein:

the respective port numbers comprise port 25 and/or port 80; and the respective port numbers are to be used as respective queue assignment key values.

* * * * *